United States Patent
Abrahams et al.

(10) Patent No.: US 9,773,398 B2
(45) Date of Patent: *Sep. 26, 2017

(54) LOCALIZED FLOOD ALERT SYSTEM

(71) Applicant: International Business Machines Corporation, Armonk, NY (US)

(72) Inventors: Faried Abrahams, Laytonsville, MD (US); Amol Ashok Dhondse, Pune (IN); Kerrie Holley, Montara, CA (US); Anand Pikle, Pune (IN); Gandhi Sivakumar, Bentleigh (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/397,007

(22) Filed: Jan. 3, 2017

(65) Prior Publication Data
US 2017/0124843 A1 May 4, 2017

Related U.S. Application Data

(63) Continuation of application No. 14/931,219, filed on Nov. 3, 2015.

(51) Int. Cl.
*G08B 21/00* (2006.01)
*G08B 21/10* (2006.01)
*G08B 25/10* (2006.01)

(52) U.S. Cl.
CPC ............ *G08B 21/10* (2013.01); *G08B 25/10* (2013.01)

(58) Field of Classification Search
CPC ...... G08B 21/10; G08B 27/006; G08B 25/10; B64C 39/024; B64C 2201/125; H04L 67/12; H04L 12/1898; H04W 4/22; H04W 4/12; H04W 76/007; H04M 11/04; H04M 3/5116
USPC .... 340/539.11, 539.13, 539.26, 539.28, 905, 340/601, 602, 618; 116/69; 455/404.1, 455/466
See application file for complete search history.

(56) References Cited

U.S. PATENT DOCUMENTS

| 5,294,210 | A | 3/1994 | Lemelson |
| 6,558,216 | B2 | 5/2003 | Yerazunis et al. |
| 6,868,314 | B1 | 3/2005 | Frink |

(Continued)

FOREIGN PATENT DOCUMENTS

| CN | 104200615 A | 12/2014 |
| CN | 104408900 A | 3/2015 |
| JP | 2008090421 A | 4/2008 |

OTHER PUBLICATIONS

Asmara et al., "SMS Flood Alert System," 2011 IEEE Control and System Graduate Research Colloquium (2011).

(Continued)

*Primary Examiner* — Anh V La
(74) *Attorney, Agent, or Firm* — Weitzman Law Offices, LLC

(57) ABSTRACT

A flood warning system and method are described. The system obtains localized flood depth information and, based upon alert parameter information provided by registered users, creates personalized flood alerts for the registered users. The method uses ultrasound derived localized flood depth information and alert parameter information provided by registered users to provide personalized flood alerts to the registered users.

6 Claims, 10 Drawing Sheets

(56) References Cited

U.S. PATENT DOCUMENTS

| | | | |
|---|---|---|---|
| 8,027,659 | B1 | 9/2011 | Daly et al. |
| 8,614,631 | B2 | 12/2013 | Pinhanez |
| 2003/0009287 | A1* | 1/2003 | Howard .................. G06Q 10/06 702/5 |
| 2007/0072583 | A1 | 3/2007 | Barbeau et al. |
| 2007/0225955 | A1* | 9/2007 | Yamaguchi ......... G06F 17/5009 703/9 |
| 2008/0212819 | A1 | 9/2008 | Cerwin et al. |
| 2008/0255754 | A1 | 10/2008 | Pinto |
| 2009/0256690 | A1 | 10/2009 | Golenski |
| 2009/0286505 | A1 | 11/2009 | Kirk |
| 2010/0245165 | A1 | 9/2010 | Kauffman et al. |
| 2011/0070025 | A1 | 3/2011 | Kiegiger |
| 2014/0032114 | A1 | 1/2014 | Titus et al. |
| 2014/0055272 | A1 | 2/2014 | McCormick |
| 2014/0156232 | A1* | 6/2014 | Cordazzo ............ G06F 17/5018 703/2 |

OTHER PUBLICATIONS

Campbell Scientific, "Flood Warning (ALERT): Real-time monitoring and control systems" (http://www.campbellsci.com/flood-warning) (retrieved Jun. 2015).

Coeval, "Iceflooding Intelligent Coeval: Coeval Flood Warning System Overview" (http://www.coeval.uk.com/product/flood-warning-system/) (retrieved Jun. 2015).

Gupta et al., "Design and Implementation of Water Depth Management and Object Detection Model Using Ultrasonic Signal System," Intl J. of Engineering Res. and Dev., vol. 4, Issue 3, pp. 62-69 (Oct. 2012).

Kertesz et al., "Photogrammetric Pavement Detection System," International Archives of the Photogrammetry, Remote Sensing and Spatial Information Sciences, vol. XXXVII, Part B5, pp. 897-902 (2015).

Margaretescu et al., "Ultrasonic Measuring System for Deposition of Sediments in Reservoirs," Proceedings of Int'l Conf. on Innovations, Recent Trends and Challenges in Mechatronics, Mechanical Engineering and New High-Tech Products Development MECAHITECH'11, vol. 3 (2011).

Srikudkao et al., "Flood Warning and Management Schemes with Drone Emulator Using Ultrasonic and Image Processing," Advances in Intelligent Systems and Computing, vol. 361, pp. 107-116 (2015).

Yamamoto et al., Research and Development of Unmanned Aviation Vehicle System for Disaster Countermeasures Advanced Materials Research, vol. 779-780, pp. 908-915 (2013).

Coeval, "Flood Warning System" (http://www.coeval.ukcom/product/flood-warning-system/) (retrieved Sep. 25, 2015).

* cited by examiner

LOCALIZED FLOOD ALERT SYSTEM

This application is a continuation of U.S. patent application Ser. No. 14/931,219 entitled "Localized Flood Alert System And Method," the entirety of which is incorporated herein by reference.

FIELD OF THE INVENTION

This disclosure relates generally to emergency warnings and, more particularly, to distribution of flood warnings.

BACKGROUND

Flooding is a problem in underdeveloped, emerging and even developed countries and can be a problem in low lying rural, suburban and even urban areas where drainage is less than optimal or has been compromised. Every year people die from drowning as a direct consequence of flooding situations. Even after the event that triggered the flooding ends, unforeseeable dangers can still be present in the areas where stagnant or slow draining water remains. Such circumstances can present a greater hazard specifically because the flood cause has ended, since people will be more inclined to discount the danger.

In some cases, this can be because of their lack of awareness of situations that did not exist prior to the flood, for example, channels cut by the original moving water, sinkholes or depressions, displaced manhole covers, etc., rendering the water in some places deeper than it might appear from the surface or would be presumed based upon a person's knowledge of the pre-flood topography. In such cases, even persons familiar with the highly local topography of that specific area may be misled into thinking that it is safe to cross the remaining water, because they are unaware of the changed situation under the water. For example, an adult attempting to cross a flooded street to safety by wading through what appears to them be about 0.5 meters (about 2 feet) to 1 meter (about 3 feet) of non-flowing water could easily find themselves in grave danger if the water conceals an open manhole directly in their path or a deep channel or sinkhole, caused by the previously flowing water, is now in their path.

In an attempt to prevent some drowning situations in commonly flooded or flood-prone areas, permanent infrastructure may be installed to warn people regarding the depth of the water at a point in the topography known to be the lowest point. Those warning systems may be as simple as poles with markings to indicate height of the water or more sophisticated warnings that rely upon floats or other technology. Such warning systems operate under the premise that, if one knows the depth at the lowest point, everywhere else will have a lesser depth. However, as noted above, those warning systems operate in the specific place where they are located and typically will not be able to account for flood-caused topographical changes, even nearby.

Moreover, such indicators cannot typically be used in, for example, the middle of a roadway, and, being fixed in place, cannot account for unusual flooding circumstances or a flood situation in locations where flooding is not common.

More recently, in the attempts have been made to identify areas where hazards exist, for example flooding, and to put out alerts via the mobile phone networks to warn persons in the area. For example, in the United States, the mobile industry, along with the Federal Communications Commission (FCC) and Federal Emergency Management Agency (FEMA), developed the Wireless Emergency Alerts (WEA) to send concise, text-like messages to users' WEA-capable mobile devices to alert users to, for example, imminent threats that include severe man-made or natural disasters, such as hurricanes, earthquakes, tornadoes, etc., or other circumstances where an imminent threat to life or property exists.

WEA use a point-to-multipoint system, so that alert messages are only sent to those within a targeted area, unlike phone, e-mail, text messages which are not location dependent. Thus, if a New York resident is in Arizona and has a WEA-capable device, and a flash flood warning issues for that area of Arizona, their device would receive an "Imminent Threat Alert" because they are within the designated area for the alert. However, alerts are no more than 90 characters, and generally only include: (i) who is sending the alert, (ii) what is happening, (iii) who is affected, and (iv) what action to take.

Canada has implemented a similar system to provide alerts via all television stations, radio stations, and broadcast distribution undertakings. In addition, the province of Alberta has its own system that broadcasts emergency and information alert messages through RSS feeds, social networks, and mobile apps.

In Europe, European Flood Awareness System is involved monitoring and forecasting floods across Europe. It provides complementary, flood early warning information up to 10 days in advance to its partner entities including the European Emergency Response Coordination Centre which collects and analyses real-time information on disasters, monitors hazards, prepares plans for the deployment of experts, teams and equipment, and works with Member States to map available assets and coordinate the EU's disaster response efforts.

In Japan, the Japan Meteorological Agency issues warnings for meteorological phenomena such as heavy rain, storms, storm surges, high waves, heavy snow and snowstorms and disseminates them through television, radio, internet and loudspeaker vans.

While these systems are a significant improvement in some cases, they are all clearly intended for broad general warnings, typically before the fact, and do not provide sufficient granularity to address highly local, let alone surface-invisible, unusual situations.

Moreover, such alert systems don't exist at all in less developed locations in many parts of Asia where variable flooding is an ongoing problem.

Thus, there is a significant technological problem regarding determining local flood depth conditions over a given local area, and providing alerts relating to local occult flood-caused conditions, in flooded areas where flooding is uncommon. Moreover, this technological problem potentially exists even within commonly flooded areas because, as noted above, local conditions can vary unexpectedly due to flood-caused hazards or changes in topography or due to particular unusual circumstances.

SUMMARY

One aspect of this disclosure involves a flood warning system. The flood warning system includes an Unmanned Aerial Vehicle (UAV) including at least one propulsion unit and telemetry circuitry, including global positioning satellite (GPS) receiver circuitry, ultrasound transceiver-based flood depth determination circuitry; and communication circuitry. The flood warning system also includes a controller that communicates flight path instructions to the UAV via the communication circuitry of the UAV, at least one processor coupled to non-transient storage such that the at least one processor can cause information to be stored within the non-transient storage and retrieved from the non-transient storage. The flood warning system additionally includes a flood alarm system, coupled to the at least one processor, that, based upon GPS information provided by the GPS receiver circuitry, will determine whether specific personal mobile devices are within a specified range of a flood impacted area and, based upon flood depth information obtained using the ultrasound transceiver-based flood depth determination circuitry, communicate flood-related data messages to the specific personal mobile devices within the specified range of the flood impacted area, in accordance with pre-specified personalized alert parameters, so as to cause personalized alerts to be displayed on those specific personal mobile devices.

One advantage provided by the foregoing is that alerts can be personalized based upon pre-specified parameters so that registered users only receive alerts appropriate to them and their situation as reflected in those parameters.

Another advantage provided by the foregoing is that evacuation of persons in flood affected areas can be performed more efficiently because different routes through or away from the flooded area(s) can be provided on an individualized basis.

Another indirect advantage of the foregoing is that the location of hazards obscured by the flood water can be determined before they may be visible so that repair resources can be prioritized and allocated appropriately, thereby improving efficiency.

A further aspect of this disclosure involves non-transiently stored personal screening information, associated with each of the specific personal mobile devices, that filters out certain flood-related data messages based upon pre-specified personalized alert parameters.

One advantage provided by this aspect is that registered users will not receive messages that are not pertinent to them.

Another aspect of this disclosure is a flood warning method that involves i) directing an Unmanned Aerial Vehicle (UAV) to an area in which a flooding condition exists; ii) receiving flood depth information covering the area in which the flooding condition exists, obtained by the UAV using an ultrasonic transceiver associated with the UAV, the flood depth information being correlated to global positioning satellite (GPS) location information; iii) storing the correlated flood depth information and GPS location information in non-transient storage; iv) generating, using a processor, graphical heat map depiction data representing localized flood depths based upon the correlated flood depth information and GPS location information; v) determining, using the processor, whether registered personal mobile devices are within a specified range of the area in which the flooding condition exists; vi) analyzing, using the processor, the flood related depth information, electronically stored in at least one storage device, relative to non-transiently stored personal screening information associated with each of the registered personal mobile devices, to determine whether flood-related data messages should be transferred to any specific personal mobile devices; and vii) for each registered personal mobile device where a result of the analyzing is that a transfer of flood-related alert information is to occur, transferring the flood-related alert information and the graphical heat map depiction data to each registered personal mobile device for display thereon.

One advantage provided by this aspect is that users are presented with a graphical depiction of determined depths so that they can be aware of sudden depth change hazards that might not otherwise be evident or visible due to the flood water presence.

An additional aspect of this disclosure involves a flood warning system. The flood warning system is made up of: at least one processor coupled to non-transient storage such that the at least one processor can cause information to be stored within the non-transient storage and retrieved from the non-transient storage, the non-transient storage having stored therein personal screening information associated with each of multiple registered personal mobile devices; and a flood alarm system implemented in a cloud environment, that will, based upon GPS information received from an Unmanned Aerial Vehicle (UAV), communicatively determine whether any of the multiple personal mobile devices are within a specified range of a flood impacted area and, based upon ultrasound-derived flood depth information received from the UAV, if any specific ones of the multiple personal mobile devices are within the specified range of the flood impacted area, will communicate flood-related data messages, screened based upon non-transiently stored personal screening information, retrieved from the non-transient storage and associated with each of the registered personal mobile devices, to the specific personal mobile devices, so as to cause only relevant personalized flood alerts to be displayed, using a processor of each of the specific personal mobile devices, on the specific personal mobile devices. The relevant personalized flood alerts comprise a heat map for at least a portion of the flood impacted area, the heat map indicating specific local depth hazards located under the flood waters within the portion, the heat map overlying on top of a street-level geographical map of the portion so that users of the specific personal mobile devices can maneuver through a part of the portion via directions specifying an appropriate path that is provided as part of the relevant personalized flood alerts and avoids specific relevant local depth hazards.

The foregoing and following outlines rather generally the features and technical advantages of one or more embodiments of this disclosure in order that the following detailed description may be better understood. Additional features and advantages of this disclosure will be described hereinafter, which may form the subject of the claims of this application.

BRIEF DESCRIPTION OF THE DRAWINGS

This disclosure is further described in the detailed description that follows, with reference to the drawings, in which.

DETAILED DESCRIPTION

Figure 1:
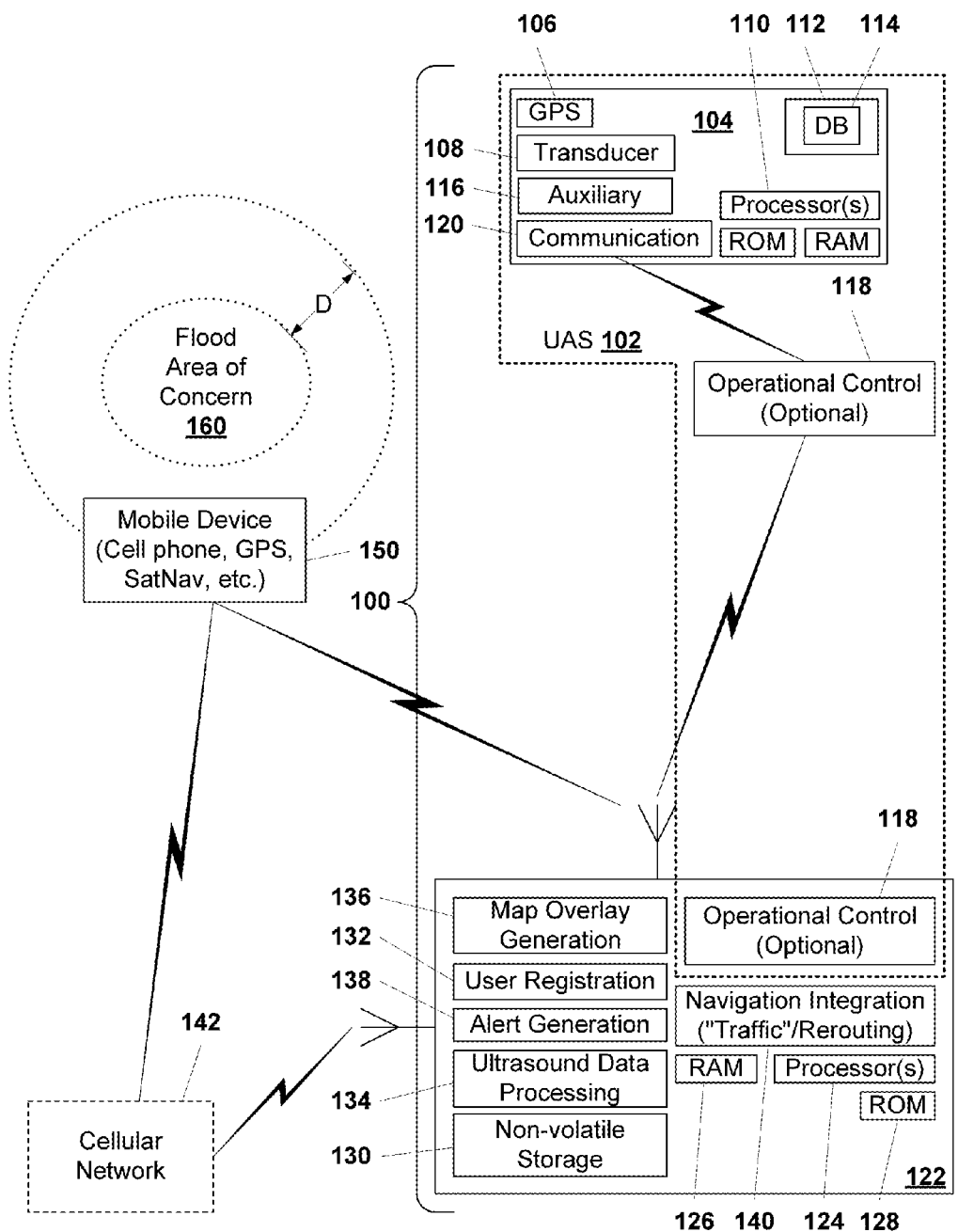
FIG. 1 illustrates, in simplified form, a simplified general representation of system incorporating the components for one example variant of a flood alert system as described herein.

In general overview, we have devised a flood alert system and associated methods that directly address the above problems by measuring the depth of flood water over a specified local area and identifying depth hazards beneath the surface of the water that may not be discernable from the surface, or may have resulted from the source of the flooding or the flood condition itself. Based upon that information, personalized and/or tailored alerts can be generated and sent to mobile devices within the area. In addition, from the measurement information, our system and methods can create a "heat map" of the depths in the affected area that can be displayed as an overlay on top of a conventional on-line map to specifically identify to relevant persons where such hazards exist as part of the alert.

Still further, versions of our system and method can be integrated with Global Positioning Satellite (GPS) navigation systems, also known as Satellite Navigation (SatNav) systems, such that traffic routing algorithms of those systems can avoid identified local depth hazards when routing people or vehicles on an individualized basis taking into account relevant parameters such as the person's height or the vehicle specifications.

Additional versions of our system can include aspects implemented in a cloud environment.

Variants of our system make use of, in part, an Unmanned Aerial System ("UAS") that is made up of an Unmanned Aerial Vehicle ("UAV"), colloquially referred to as a "drone," having certain capabilities as described herein, along with its ground-based controller, and the communications connection that connects them, to ascertain specific unusual ground-based hazards in a flooded area and provide meaningful and specific information that can allow for individualized alerts based upon specifications for persons or things in the affected area. More particularly, our system uses an ultrasound transducer on the UAV to detect the varying depth of water over a given area and create a heatmap for the results so that that can be added as an overlay on top of a map, thereby allowing the location of dangerous local depth hazards to be noted, and allow paths to be plotted through the flooded area while avoiding the hazards.

Moreover, depending upon the specific implementation of our system, people can personalize the circumstance(s) so that they only receive the information under certain specified circumstances relating to their personal situation.

For example, with some implementations, persons can specify certain parameters such as vehicle axle height or personal height (or some more specific physical aspect, such as waist height, knee height, an inability to swim, etc.) because a water depth that may be impassible or dangerous for crossing by a child under 5 feet tall due to certain unseen depth hazards that may easily be manageable for a person who is 6 feet tall. Therefore, the 6 foot tall person may specify that they only want to receive alerts where the water is over a height of "X" whereas the child should receive all alerts where water is over 1 foot deep. Likewise, an area of water that has a narrow and deep rut in the center may be impassible by a vehicle with an overall tire diameter of 19-20 inches, but may easily be forded by a vehicle with an overall tire diameter of 30 inches. Moreover, such information can be used to modify the heatmap that is displayed on a specific device, based upon the parameters, as described in greater detail below.

Thus, advantageously, with our invention, different people can follow different paths to navigate away from, or thorough, the affected area without having to avoid the water covered area entirely.

With the foregoing in mind, various example implementation variants and their components will now be described.

System Components

FIG. 1 illustrates, in simplified form, a simplified general representation of system 100 incorporating the components for one example variant of a flood alert system as described herein.

As shown, in FIG. 1, the system 100 is made up of multiple major subsystem components, a UAS 102 and a management operations subsystem 122 and, optionally, in this example implementation variant, one or more local mobile devices 150 located within about a specified distance "D" of an flood area of concern 160.

UAS 102 is made up of a UAV 104, typically a multiple propeller (a.k.a. "rotor") UAV, for example a "quadcopter" (4 propellers), "hexacopter" (6 propellers), or "octocopter" (8 propellers) having sufficient lift capabilities to carry the required equipment and fly at a slow enough speed that the required water depth measurements described below can be taken. Alternatively, the UAV 104 functions can be performed by multiple smaller synchronized UAVs so that they each require reduced lift capabilities and can cover a larger area in a single pass. For purposes of simplicity, it is to be understood that every reference to a UAV should be understood to encompass both a single "heavy lift" UAV and two or more UAVs acting in concert to perform the functions described herein without regard to which individual UAVs perform what specific function(s).

Typically, the UAV will be of the type that generates its lift through use of multiple propellers, although a single propeller "helicopter-type" UAV may be used for some implementations. Irrespective, of the type of UAV, the UAV 104 is equipped with multiple components: (i) a GPS receiver 106 so that its location during flight can be determined and/or tracked, (ii) an ultrasound transducer system 108 that can be used to measure the depth of flood water under the flight path of the UAV 104, (iii) a processor 110 and associated non-volatile storage 112 (for programs and/or data) that, in some cases may include a small database 114 as described herein, and (iv) may optionally include certain auxiliary components 116 such as, for example, any one or more of: a video camera to allow for operational control 118 of the UAV via visual navigation of the UAV 104, one or more deployable reflective elements, or stabilization equipment (for example, gyro-stabilization, gimbals, and/or GPS-stabilization) to help ensure stable flight of, and/or measurements by, the UAV 104. The UAV 104 also has appropriate well known wireless communication equipment 120 that will allow operational control 118 of the UAV 104 to be handled wirelessly by a human operator using a UAV controller and acting from a location outside the flood area of concern 160. The wireless communication equipment 120 can also allow for transfer of information from the storage 112 of the UAV 104 to the management operations subsystem 122. Alternatively, the operational control 118 can be implemented as part of the UAV 104 itself, if the UAV is of a type capable of autonomous operation, such that a flight path can be programmed into the UAV 104. In such cases, using a human operator to act the as operational control 118 by piloting the UAV can be dispensed with.

It should be noted that, in some cases, the flood depth can be calculated by emitting ultrasound waves from the ultrasound transducer system 108 on the UAV 104 and measuring the timing of the reflected waves bouncing back both from the surface of the flood water and from the ground beneath the flood water in a given location and by subtracting the former measurement from the latter measurement to yield a time differential that can, in a known manner, be straightforwardly used to determine the depth at that location.

In other cases, it may not be possible to obtain sufficiently accurate readings of distance between the UAV 104 and the surface of the flood water directly. In those instances, the UAV 104 can either use something floating on the surface of the flood water, for example, a piece of debris, or if appropriately equipped, it can drop a buoyant reflective element into the flood water and use reflections off that element to determine the distance to the water surface.

For purposes of completeness, in general, the depth determination will involve emitting ultrasound waves from the UAV 104 towards the ground and receiving back the reflected ultrasound waves, with the timing between emission and receipt being calculate-able as indicative of the distance from the UAV 104 to the reflecting surface (i.e., water surface and/or ground) using well known correction algorithms that account for changes in density of the water type (i.e. fresh vs. salt) due to depth, or to correct for clouding caused by particles, mud, silt or other fine debris present in the water.

Absent access to or use of such algorithms, depth calibration can be performed by taking measurements using different water (e.g., fresh water, saltwater, clear water, cloudy water, muddy water, turbid water, mineral-containing water, etc.) as might exist within the likely area(s) of concern using specific depths as standards, for example, various depths between about 1 foot and about 8 feet deep, although greater depths can be included. From those measurements, appropriate correction adjustments can be derived that are within an acceptable margin of error on the order of up to about six inches, although average error deviations of less than three inches are better and less than one inch is ideal. The measurements need not be precise because it is unlikely that the flood waters will be fully stagnant and calm given the likelihood of disruption in the form of ripples or waves from, for example, wind and objects (such as persons moving or debris floating or moving therein), and so such deviations will likely not be significant. Moreover, since it has been known for many centuries that water generally "seeks its own level," the water surface level readings (if taken at the flooded site) can be averaged to yield a more accurate approximation of the water surface location.

To the extent needed, the correction information can be maintained within the small database 114 such that, if the UAV 104 has the processing capability, that correction information can be used to account for the specific type of water. Depending upon the particular implementation, multiple sets of correction information can be maintained for different types of water conditions and then the type of conditions can be set immediately before a mission begins or "on the fly" based upon a visual observation of the conditions when the UAV 104 arrives on site, the latter being helpful if it is possible that different conditions exist in different parts of the flood area of concern 160.

Likewise, if the UAV 104 has the appropriate processing capability and programming, it may be possible for reading corrections to be done "on the fly" on the UAV 104 using the readings and correction information within the small database 114.

In any event, the flood depth-related data obtained using the ultrasound transducer system 108 can, depending upon the particular implementation, also be non-transiently stored in the storage 112 and/or database 114 along with correlated location information obtained by the GPS receiver 106 of the UAV 104. At some point, the depth-related data and correlated location information obtained by the GPS receiver 106, will be transferred to the management operations subsystem 122 for further processing. Depending upon the particular implementation variant, that may occur after the survey of the flood area of concern 160 is complete or while it is in progress.

The management operations subsystem 122 is the predominant "brains" of the system 100. Depending upon the implementation variant, the management operations subsystem 122 can be implemented and operated relatively local to the flood area of concern 142, for example, in a mobile vehicle that can be transported to near the flood area of concern 142, it can be operated at some fixed location, for example, a local government facility or commercial operation whose services can be contracted for on a term or "as-needed" basis, or it can be implemented in a cloud computing environment such that it can be provided, in whole or part, as a service (PaaS and/or IaaS as described below) to multiple localities on an "as needed" or contract basis. Thus, depending upon the particular implementation, the UAV 104 can be owned and operated by the same entity that provides the management operations subsystem 122 or the UAV 104 can be separately owned, for example, by a municipality, but configured to work in concert with the management operations subsystem 122 operations provided by someone else. In addition, in some cases, aspects of the management operations subsystem 122 can be distributed such that part of the functions are handled, in whole or part, by some other device(s) or in other location(s), for example, part of the operations could be handled by an application program (or "App") running on a registered user's mobile device(s) 150.

The management operations subsystem 122 of this variant system 100 is made up one or more computers, having associated processor(s) 124, RAM 126, ROM 128, non-volatile program and data storage 130 containing programming which, when executed by the processor(s) 124 will cause the management operations subsystem 122 to perform at least the following functions (which will each be described in greater detail below): user registration 132, ultrasound data processing 134, map overlay generation 136, alert generation 138, and, optionally, navigation system integration 140, as well as performing certain operational control 118 functions as well.

The user registration 132 function involves the process whereby individual users can opt into the system and thereby become known to the system 100 and the process whereby individual opting-in users will provide alert parameters, that will be used as a screen against which flood-related data messages will be tested, so that a given user will receive personalized alerts on their mobile device 150 consistent with the alert parameters they specified. Depending upon the particular implementation, this function may be interacted with by a user via a normal computer, for example, their home desktop computer, or using a laptop, tablet or other computer device, or it may involve doing so via an interface on their GPS or Satellite navigation system if it has two-way communication capability, using the telephone either by speaking with an attendant or via an Interactive Voice Response (IVR) unit, or using an App on a mobile device.

In implementations where an App on a user's mobile device 150 is required, in some cases, the alert parameters may be maintained by the App and stored on that user's mobile device 150 such that the screening of the flood-related data messages relative to the alert parameters will occur on that user's device 150.

The ultrasound data processing 134 function involves the analysis of the flood related depth reading information obtained by the UAV 104 which, depending upon the particular implementation variant, will determine the flood depth at the locations making up the flood area of concern 160 based upon the depth-related data and correlated location information obtained using the UAV 104.

The map overlay generation 136 function involves creating a "heatmap" resulting from the ultrasound data processing 134 function or, in some cases, directly from the depth-related data and correlated location information obtained using the UAV 104. A "heatmap" as described herein is a graphical representation of the depth information using, for example, different colors or shadings of one or more colors to represent different flood water depths or depth gradations within the flood area of concern 160. The heatmap is created such that it can be used as an overlay on top of, or integrated as an overlay with, a street-level geographical map, such as can be viewed on a mobile device 150 using, for example, Google maps, Mapquest maps, OpenStreetMap, or Apple Maps, or a map constructed using map data from, for example, the former, or from HERE.com (formerly NAVTEQ) or Tele Atlas, to name a few.

The alert generation 138 function involves, depending upon the particular implementation, either (i) screening flood related data messages using the alert parameters users have provided, and sending personalized alerts resulting from the screening to the mobile devices 150 of specific users for display on their mobile devices 150, or (ii) sending the flood related data messages to an App on each of the user's mobile devices 150 where they will be screened and only displayed to the user if they "pass through" the personalized parameters screen. In general, the sending will occur via the local cellular network 142 to which the users' devices 150 are connected, but only when they are within a specified distance of the flood area of concern 160. This is important for the same reasons that the WEA alerts are location dependent. The mobile device 150 location can be ascertained through cooperation with providers of the cellular network(s) 142 via which the mobile devices communicate because they can ascertain the location of a mobile device through, for example, GPS (if it has a GPS capability) or using, for example, known location finding techniques such as "time-difference of arrival" (TDOA) and/or "angle of arrival" (AOA). Alternatively, in some implementations, alerts such as described herein can be configured or formatted and passed to a current emergency alert system, like WEA, to take advantage of infrastructure already in existence. In other cases, the alerts can be sent only to those specific cellular towers covering the flood area of concern 160 such that, if a particular mobile device 150 is within the range of those cellular towers it will receive the alert and, if out of range of those towers, it will not receive the alert.

In addition, with some variants, the map overlay generation 136 function and alert generation 138 function may work in conjunction such that the heatmaps themselves can be personalized as part of the alerting function. For example, if the personalized parameters indicate that flood depths of two feet or less are of no concern, the heatmap may be modified so that depths of less than two feet are not even displayed. Similarly, the personalized parameters may specifically be for a vehicle, so the heatmap could be modified to exclude depth data for flooding that is not specifically on a road.

The optional navigation system integration 140 function is essentially a translational function that ensures that the personalized alerts can be displayed and/or handled by a navigation system equipped to receive them. Depending upon the particular implementation, this may simply involve data translation, or it may involve more complex operations. For example, some variants may be configured to interact with a navigation program or device (e.g., Google maps directions, Mapquest directions, Apple maps directions, or navigation devices such as sold by TomTom International BV, Garmin Ltd., and MiTAC International Corporation under the Magellan brand, to name a few) so that the personalized alerts can be handled like traffic or a closed road for purposes of re-routing. This can be handled both for walking directions and vehicular directions. Thus, the same personalized information can be handled differently for a vehicle and a child moving between the same points, for example during an evacuation. For example, a relatively narrow, but deep underwater channel cutting across a road at an angle might easily be avoided or stepped over by an adult, but could present a significant hazard for a car. Advantageously, this option can therefore allow for smoother evacuation in some cases because everyone need not be routed along the same evacuation paths out of or through the flooded area of concern, but rather, using the personalization, different safe paths can be specified on an individualized basis. This is a significant improvement from a safety standpoint.

Although some variants in this disclosure involve a cloud computing environment, implementation of the teachings recited herein are not limited to such cloud computing environment. Rather, embodiments of the present invention can be implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

The characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, tablets, smart watches or other wearable computer devices, etc.).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The service models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The deployment models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 2:
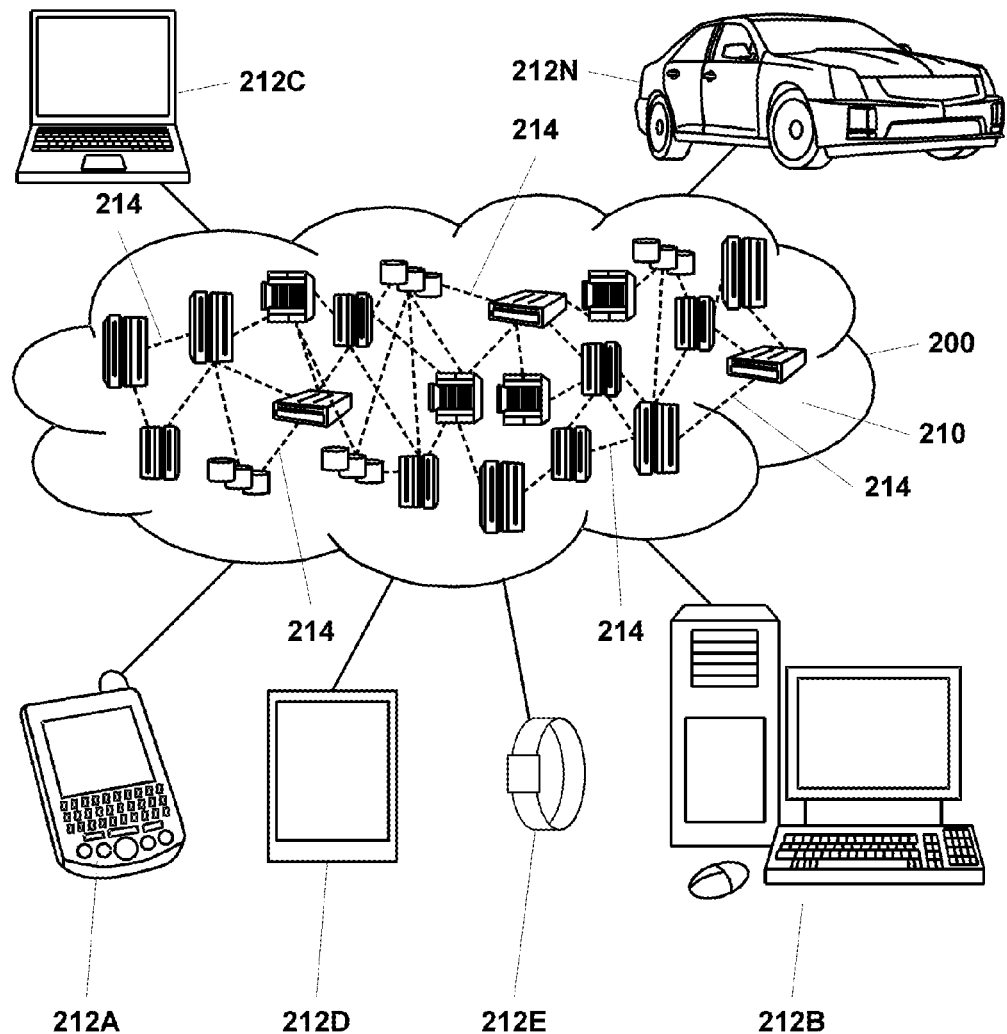
FIG. 2 illustrates, in simplified form, a cloud computing environment suitable for implementing certain aspects of some variants of the system and methods described herein.

FIG. 2 illustrates, in simplified form, a cloud computing environment suitable for implementing certain aspects of some variants of the system and methods described herein.

Referring now to FIG. 2, an illustrative cloud computing environment 200 is depicted. As shown, cloud computing environment 200 comprises one or more cloud computing nodes 210 with which local computing devices used by cloud consumers, such as, for example, personal digital assistant (PDA) or cellular telephone 212A, desktop computer 212B, laptop computer 212C, tablet computer 212D, smart watch or other wearable computer device 212E, and/or automobile-based computer system 212N may communicate. Nodes 210 may communicate with one another over communication paths 214. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 212A-212E, 212N shown in FIG. 2 are intended to be illustrative only and that computing nodes 210 and cloud computing environment 200 can communicate with any type of computerized device over any type of network and/or network addressable connection (e.g., using a web browser).

Figure 3:
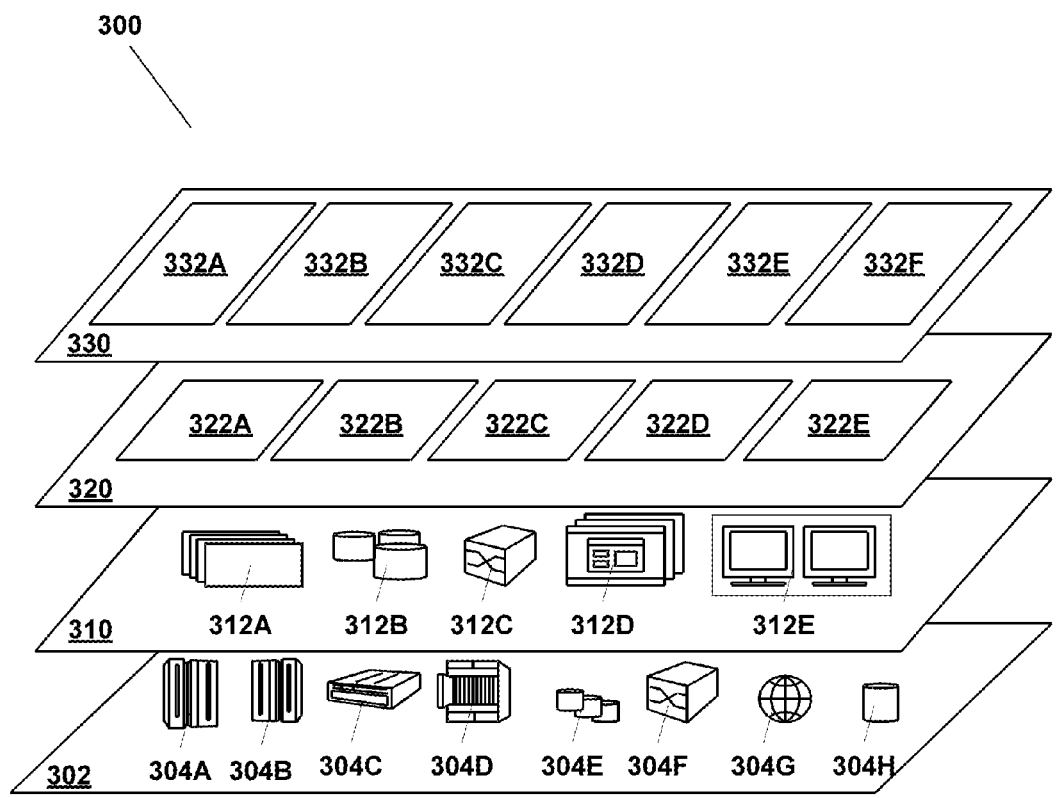
FIG. 3 illustrates, in simplified form, abstraction model layers for the environment of FIG. 2.

FIG. 3 illustrates, in simplified form, abstraction model layers 300 for the environment of FIG. 2. It should be understood in advance that the components, layers, and functions shown in FIG. 3 are intended to be illustrative only and embodiments of the invention are not limited thereto. As depicted, the following layers and corresponding functions are provided:

The hardware and software layer 302 includes hardware and software components. Examples of hardware components include: mainframes 304A; RISC (Reduced Instruction Set Computer) architecture based servers 304B; servers 304C; blade servers 304D; storage devices 304E; and networks and networking components 304F. In some embodiments, software components include network application server software 304G and/or database software 304H.

The virtualization layer 310 provides an abstraction layer from which the following examples of virtual entities may be provided: virtual servers 312A; virtual storage 312B; virtual networks 312C, including virtual private networks; virtual applications and operating systems 312D; and virtual clients 312E.

In one example, the management layer 320 may provide the following functions:

Resource provisioning 322A—provides dynamic procurement of computing resources and other resources that are utilized to perform tasks within the cloud computing environment.

Metering and Pricing 322B—provide cost tracking as resources are utilized within the cloud computing environment, and billing or invoicing for consumption of these resources. In one example, these resources may comprise application software licenses. Security provides identity verification for cloud consumers and tasks, as well as protection for data and other resources.

User portal 322C—provides access to the cloud computing environment for consumers and system administrators.

Service level management 322D—provides cloud computing resource allocation and management such that required service levels are met.

Service Level Agreement (SLA) planning and fulfillment 322E—provide pre-arrangement for, and procurement of, cloud computing resources for which a future requirement is anticipated in accordance with an SLA.

Workloads layer 330—provides examples of functionality for which the cloud computing environment may be utilized. Examples of workloads and functions which may be provided from this layer include: mapping and navigation 332A; software development and lifecycle management 332B; customer registration and support 332C; data analytics processing 332D; transaction processing 332E; and localized flood depth alerting 332F.

Operational Aspects of the Components

Having described the various components of different variant flood alert systems, certain aspects of the operation will now be described with reference to FIGS. 4-7.

Figure 4:
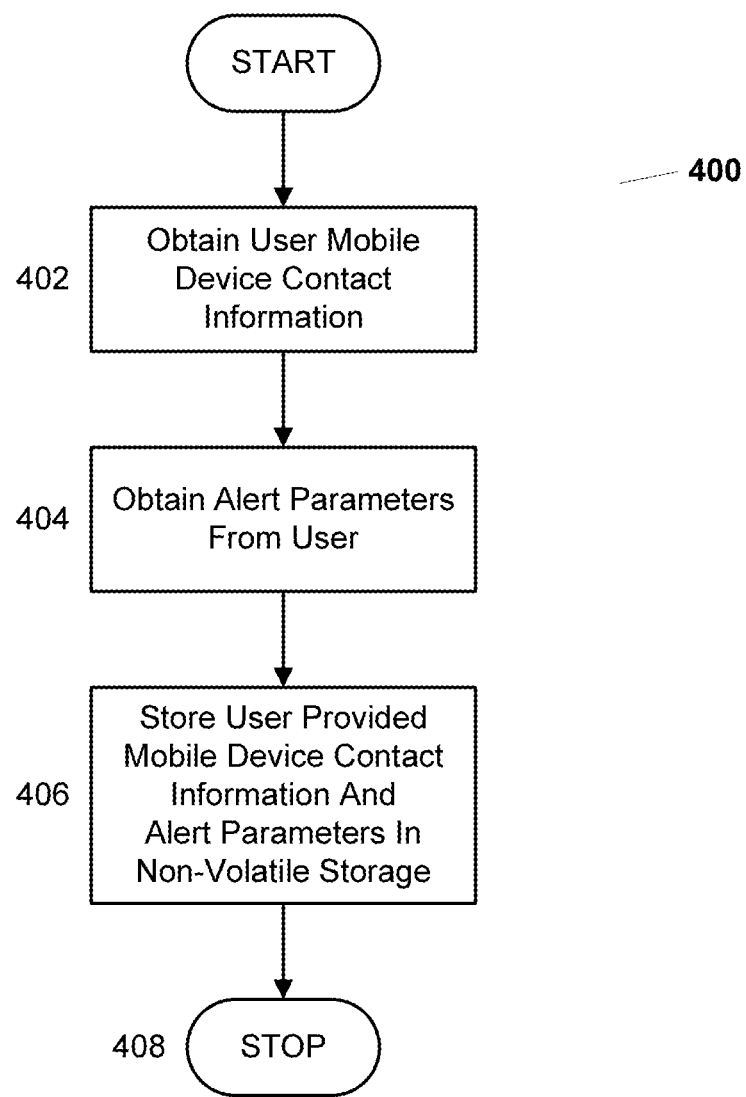
FIG. 4 is a simplified flow chart for the user registration function from the standpoint of the system.

FIG. 4 is a simplified flow chart 400 for the user registration function from the standpoint of the system. The process begins with a user seeking to register with the system. If appropriate, the user may begin by downloading and installing a program or App onto the device on which they wish to receive alerts. Alternatively, the user may be instructed to download and install the program or App after they have completed the registration process. With still another alternative, following registration, the user may be sent a link via e-mail or SMS text containing a unique identifier code that, when "clicked" registers the mobile device with the system, and in some variants, triggers download and installation of the program or App if necessary for the particular user device.

The user accesses the system and the system obtains the user's mobile device information (Step 402) either because the user provides the contact information for their mobile device(s) or, in some cases if the user is calling from the mobile device to be registered, the system can directly capture that contact information.

Next, the system obtains the relevant alert parameters from the user (Step 404) which, in the case of the individual registering. may include, for example, querying as to the user's height, age, any problems with walking (e.g., are they wheelchair bound, do they use crutches, a cane or a walker to assist with mobility), can they swim, etc. Those parameters may further include whether, when traversing an area impacted by a flood condition, might they be accompanied by a child, in which case the child's age and/or height might also be obtained. Likewise, they may be given the opportunity to provide vehicle information that could be used for vehicle re-routing based upon its parameters, for example, make and model (to ascertain likely door or exhaust pipe height) and whether the vehicle has been raised or lowered from its factory height by changing the wheels and/or tires or modifying the suspension.

The information obtained from the user is then stored in non-volatile storage (Step 406) so that it can be accessed should a flood condition exist while the registrant is within a specified distance from it.

At this point, the registration function is complete (Step 408).

Of course, the foregoing can be augmented by collection of other information as appropriate or desired for the particular implementation.

Figure 5:
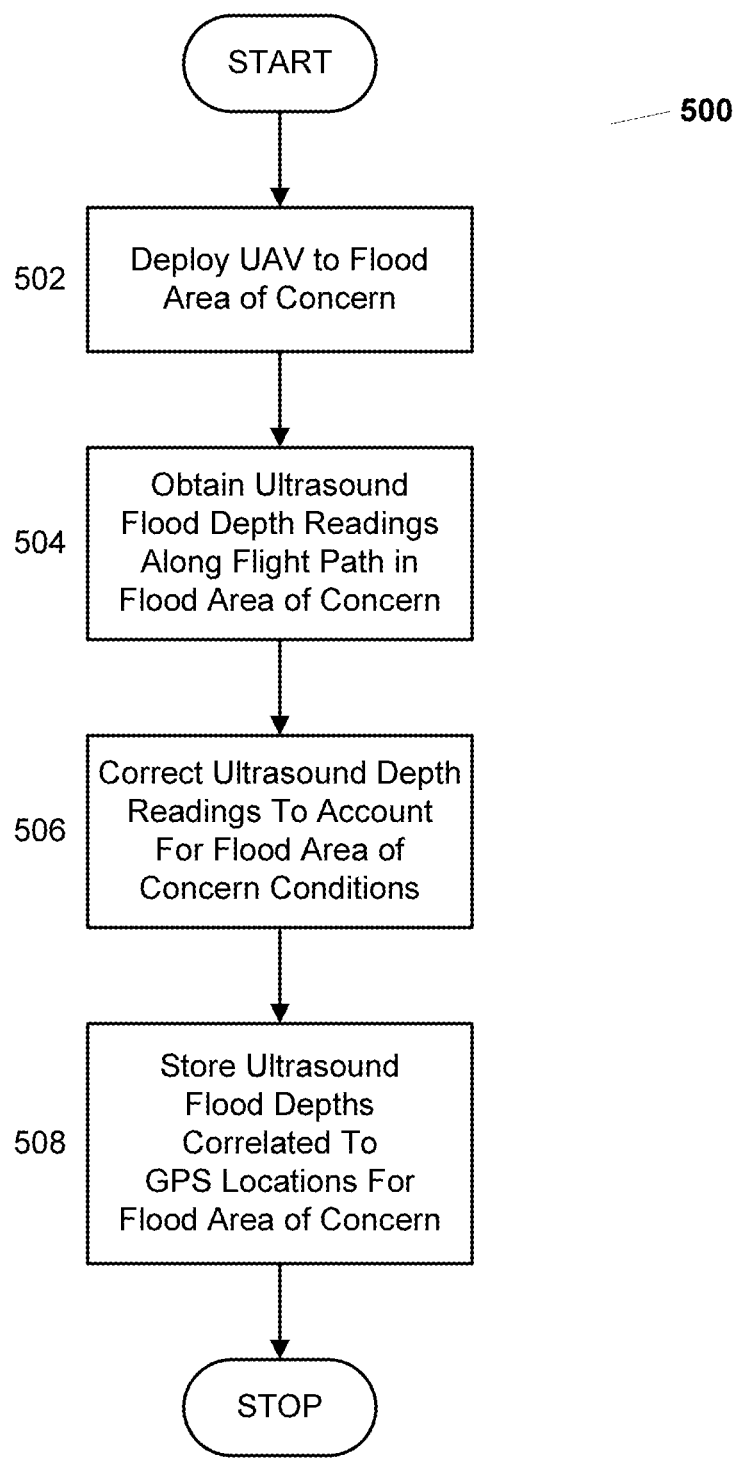
FIG. 5 is a simplified flow chart of the process by which information regarding the water depth in the flood area of concern is obtained.

FIG. 5 is a simplified flow chart 500 of the process by which information regarding the water depth in the flood area of concern is obtained.

The process begins with the deploying of a UAV to the flood area of concern (Step 502). This may involve physically bringing the UAV to a location near the flood area of concern and then initiating its flight, or it may be flown from some remote location to the flood area of concern. If the UAV is of a type that can act autonomously this step may include programming of the flight path into the UAV.

Next, the UAV will obtain ultrasound flood depth readings along the flight path within the area of concern (Step 504). This will be done in a manner described above and may involve the UAV flying multiple passes, in some cases, in different directions, over the flood area of concern to ensure that the spacing between measurement data is not too far apart to miss important hazards (i.e., to ensure proper resolution of the depth gradations within the area). Advantageously, because the depth information is correlated to the GPS location information for where the readings are taken, the readings need not be taken (or stored) in any particular order because they can later be organized based upon the GPS location information. Thus, on one pass, depth data could be taken for locations having the coordinates (x,y), (x+4, y), (x+8, y) and several reading later, depth data for locations having the coordinates (x+2, y−2), (x+2, y), (x+2, y+1) could be taken and, based upon those coordinates, would know that the second reading of the later pass (x+2, y) is data regarding the depth midway between the first two coordinates (x,y), (x+4, y) of the earlier pass.

In cases where local water conditions (i.e., fresh vs. salt, or the turbidity) may affect the depth readings, the readings are corrected to take those conditions into account (Step 506).

Finally, the flood depth information correlated to the GPS locations where the measurements were taken are stored in non-volatile storage for later use (Step 508).

Figure 6:
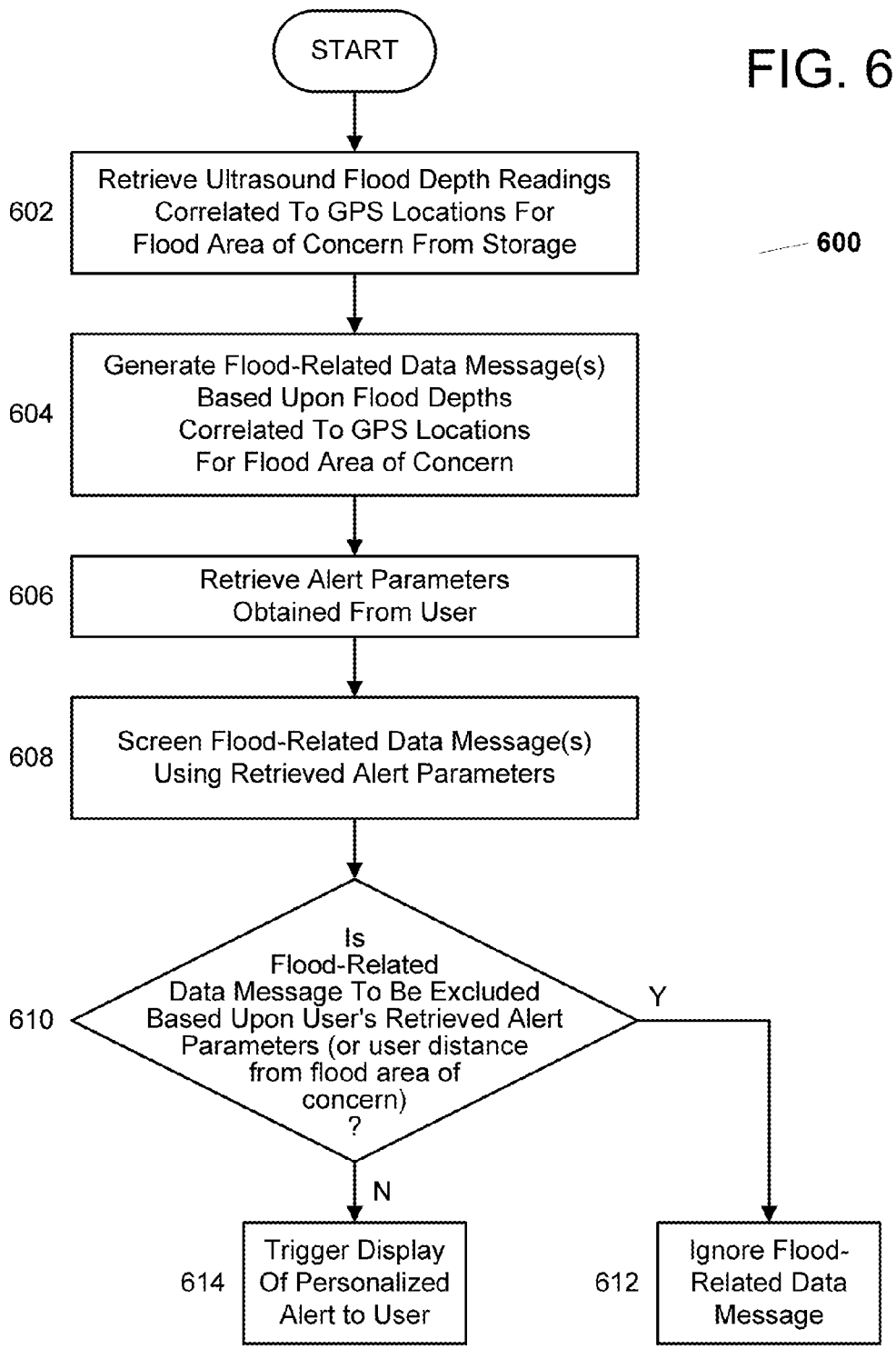
FIG. 6 is a simplified flow chart of the process by which personalized alerts are created.

FIG. 6 is a simplified flow chart 600 of the process by which personalized alerts are created.

The process begins with the retrieval of the flood depth information and associated GPS location information (Step 602). Based upon that information, flood-related data message(s) are generated (Step 604). To do so, depth and GPS data will be used to construct a message that can be displayed for a user. Depending upon the particular implementation, the message may simply identify one or more hazards and their location, for example, "6 foot deep water centered at coordinates {Longitude, Latitude} surrounded by 3 foot deep water" or translate the information into a more explicit/detailed message, for example, "Due to flooding on Main Street, between Elm St. and Maple St. there is a hidden sink hole on the Eastbound side approximately 50 feet from Elm St. where the water depth abruptly changes from 3 feet to over 6 feet deep." The relevant data regarding depth and location may also accompany the message for use in the personalization screening process. Note here that the generated message may also be in the form of graphical information for display as an overlay in conjunction with a map, or may be information that another device, such as a navigation system can use for re-routing purposes. In such a case, the data may be translated to a form recognizable by the navigation system as, for example, traffic, a lane blockage, or a closed road.

Next, the alert parameters obtained from the registered users are retrieved from storage (Step 606) and used to screen the flood-related data messages (Step 608). As noted above, this may involve a comparison to determine whether the flood-related data message is one that the user wishes to receive. For example, if the user has only registered their vehicle, or the vehicle is a raised SUV with a door height that is over 2 feet high, then they may not wish to receive alerts for flood depths under 3 feet or in pedestrian-only areas.

Thus, a determination is made, for each registered user (or all registered users within the specified distance of the flood area of concern if their locations have already been determined), as to whether the flood-related data message should be excluded, on an individual registration basis, based upon each user's alert parameters (Step 610). If the flood-related data message should be excluded, it is ignored (i.e., its display on the user's registered device is not triggered) (Step 612). If the flood-related data message should not be excluded, display on the user's registered device is triggered (Step 614).

Figure 7:
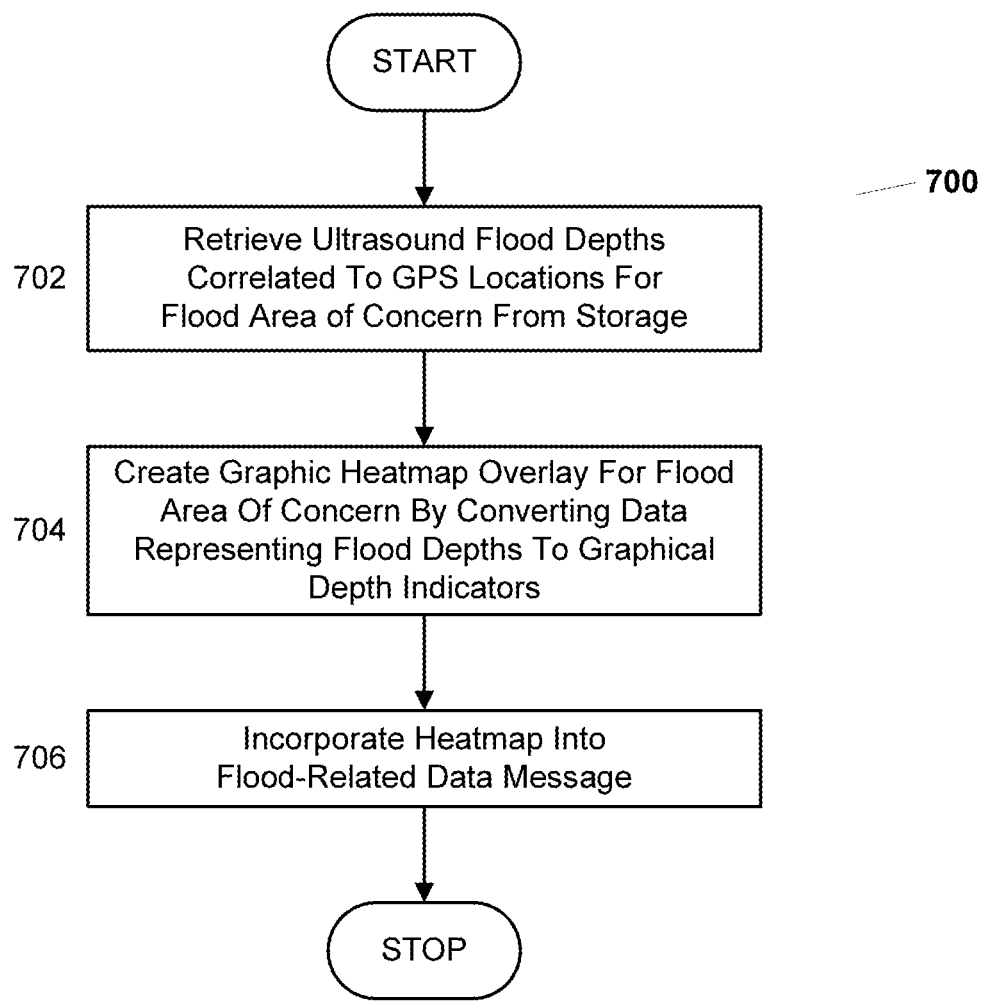
FIG. 7 is a simplified flow chart of the process by which heatmaps, as described herein, are created.

FIG. 7 is a simplified flow chart 700 of the process by which heatmaps, as described herein, are created.

This process would typically optionally be incorporated into Step 604 of FIG. 6, although it could be performed separately or concurrently with Step 604 of FIG. 6. The process begins with the retrieval of the flood depth and GPS location information (Step 702). Depending upon the particular implementation, the information can have been stored in a database or tabular form, for example as shown in Table 1, or in any other organized manner that maintains the correlation of depth and location.

TABLE 1

| Longitude | Latitude | Depth | . . . | Other Info |
|---|---|---|---|---|
| x | y | 2 | . . . | |
| x1 | Y1 | 2 | . . . | |
| . | . | . | . . . | |
| . | . | . | | |
| . | . | . | | |
| xn | yn | 7 | . . . | |

Next, a heatmap is created (Step 704) by graphically representing the location and depth information in a manner that can be overlayed on top of, or integrated with, a map for display. Depending upon the particular implementation, the depth information can be represented such that different depths are shown as different colors, different gradations of colors or grey scale, different patterns fro each depth, etc., the important aspect being that the way the depth is graphically conveyed is easily and quickly understood, not the manner in which it is displayed.

Once the heatmap has been created, it is integrated into the flood-related data message (Step 706).

Having described the various key processes, a representative example will now be presented to illustrate some of the features and advantages from different user's perspectives.

Figure 8:
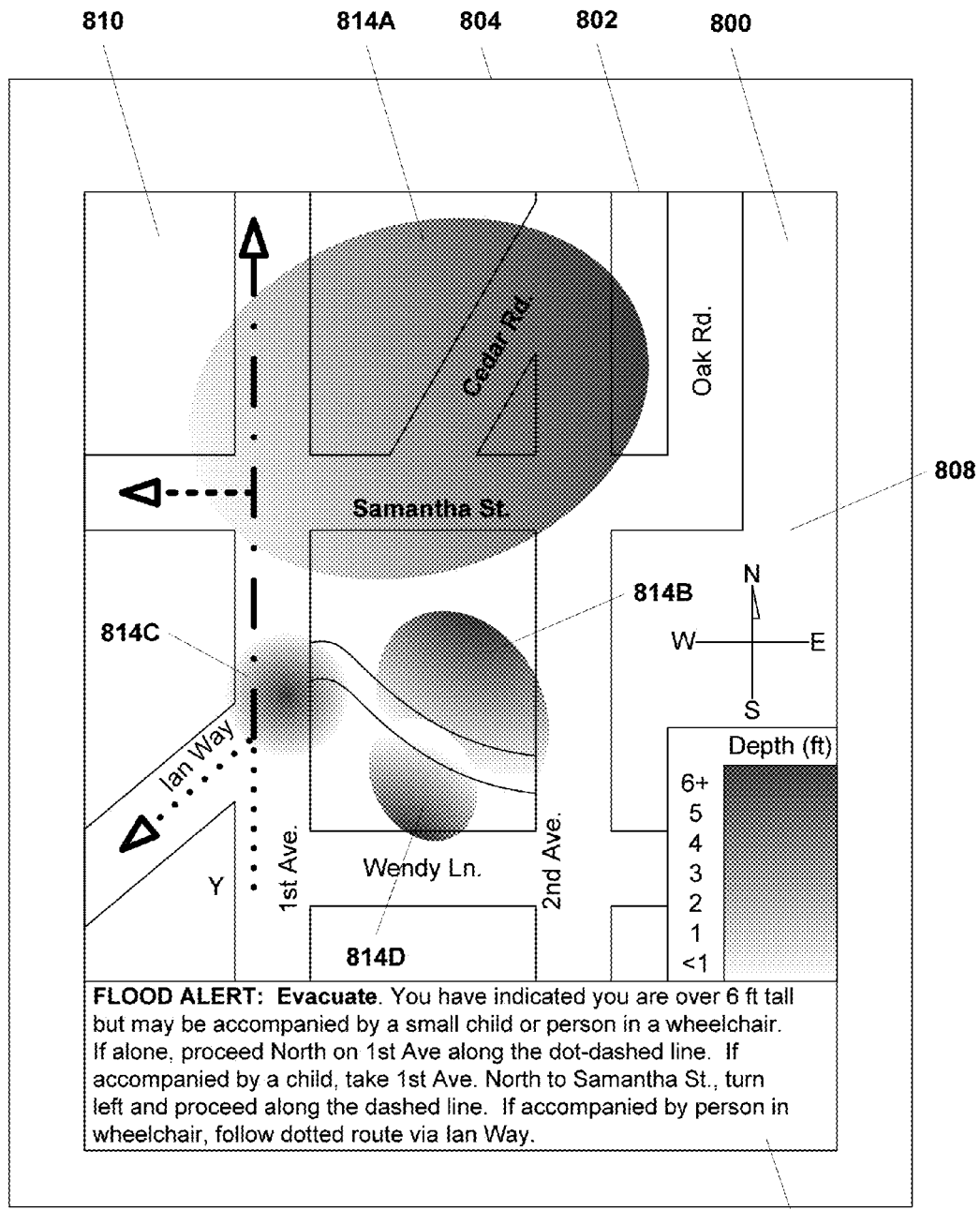
FIG. 8 illustrates, in simplified form, one example of a personalized alert displayed in an interface of a registered user's mobile device.
Figure 9:
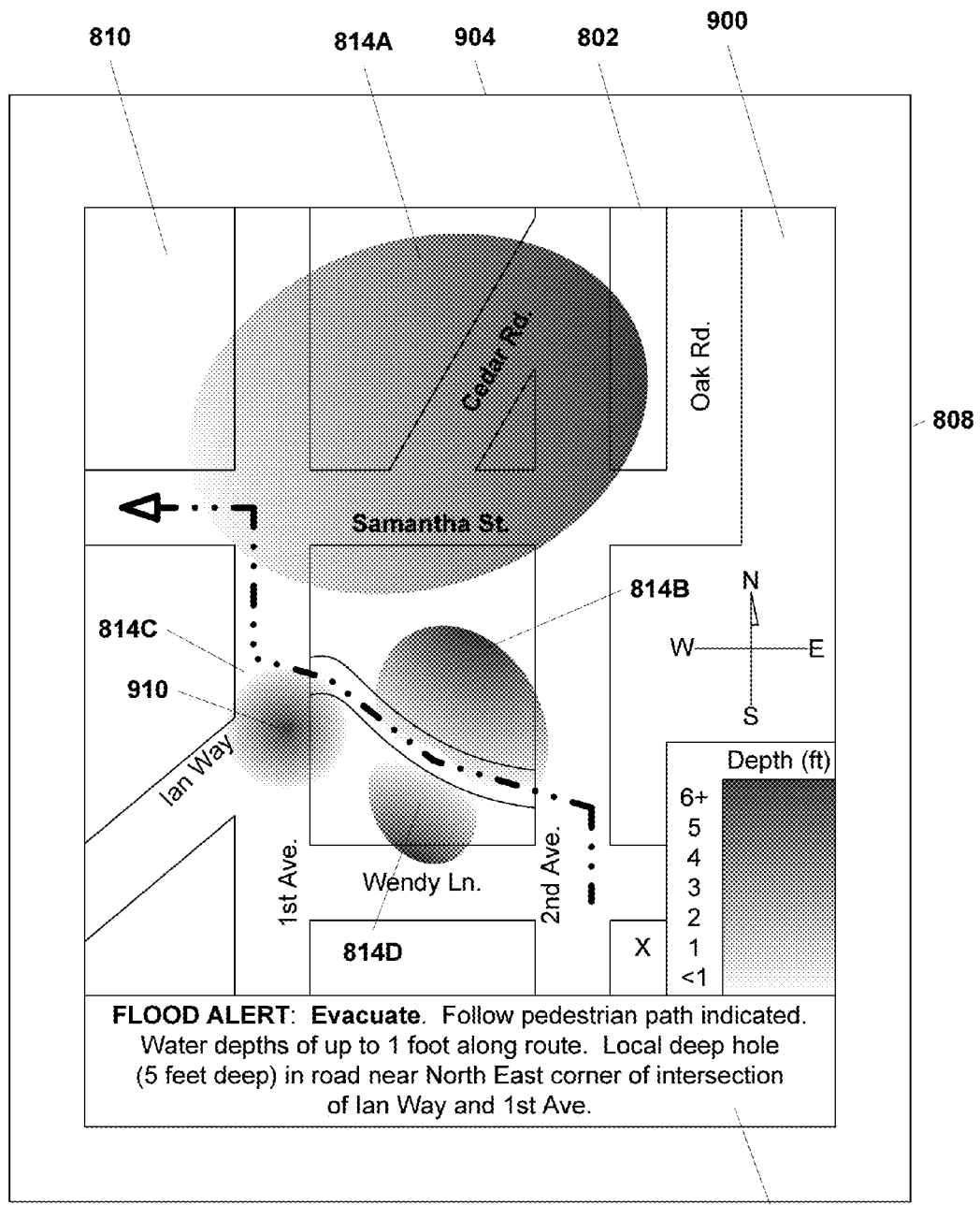
FIG. 9 illustrates, in simplified form, another example of a personalized alert displayed in an interface of a different registered user's mobile device.
Figure 10:
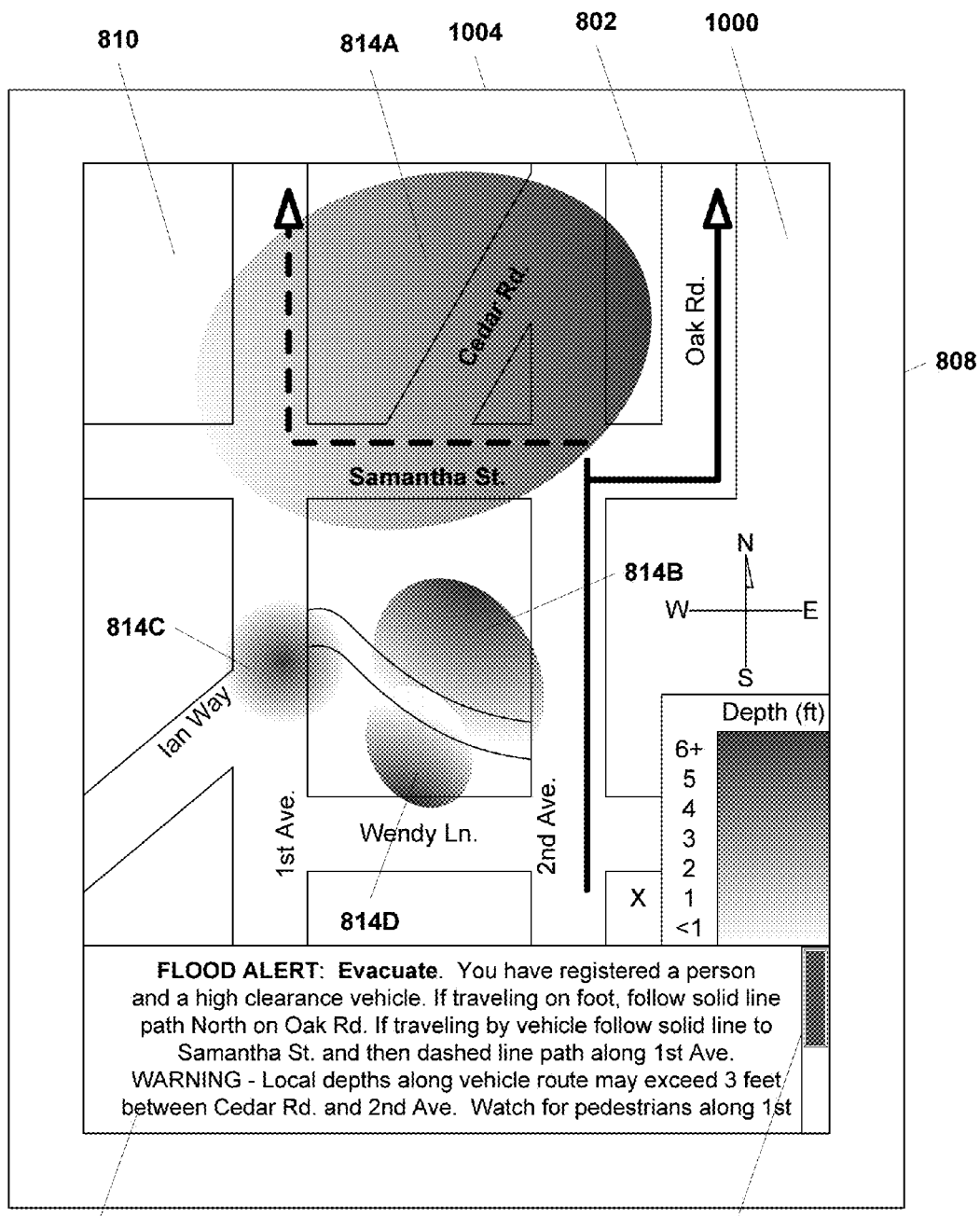
FIG. 10 illustrates, in simplified form, yet another example of a personalized alert displayed in an interface of a registered user's mobile device.

FIGS. 8-10 illustrate, in simplified form, example interfaces containing different personalized alerts displayed on different user's mobile devices for the same portion of a flood area of concern (i.e., flood impacted area).

Specifically, FIG. 8 illustrates, in simplified form, one example of a personalized alert 800 displayed in an interface 802 of a registered user's mobile device 804 because they are located at the location marked "Y" which is within the specified distance of a flood area of concern, only part of which is shown.

As shown in FIG. 8, the personalized alert 800 is made up of a text alert 806 accompanied by a heatmap 808, that overlays a displayed map 810, and contains UAV-identified flood depths within the part of the map 810 displayed and an associated key 812 that correlates the shade values to the local flood hazard areas 814A, 814B, 814C. As shown, the text part 806 of this flood alert is personalized for a registered user who has provided alert parameters that include their height and the fact that they may be accompanied by someone else who cannot negotiate the same terrain that they can. In addition, the alert graphically displays different evacuation routes in order to accommodate that registered user's particular situation at that time in accordance with their pre-specified parameters.

FIG. 9 illustrates, in simplified form, another example of a personalized alert 900 displayed in an interface 802 of a different registered user's mobile device 904 because they are located at the location marked "X" which is also within the specified distance of the flood area of concern shown in FIG. 8.

As shown in FIG. 9, the personalized alert 900 is similarly made up of a text alert 906 accompanied by the heatmap 808 of FIG. 8. As shown, the text part 906 of this flood alert is personalized for this registered user who has also provided alert parameters that indicates that they are a youth who is about 4 feet tall. As such, the alert graphically displays a different evacuation routes appropriate for that individual that takes them along a pedestrian path that contains water less than 1 foot deep. In addition, a local deep hole hazard 910 is identified both in the text and in the heatmap because of its proximity to their evacuation route.

FIG. 10 illustrates, in simplified form, yet another example of a personalized alert 1000 displayed in an interface 802 of a registered user's mobile device 804 because they too are located at the location marked "X" (i.e., within the specified distance of a flood area of concern).

As shown in FIG. 10, the personalized alert 1000 is also made up of a text alert 1006 accompanied by the heatmap 808, that overlays their displayed map 810. As shown, the text part 1006 of this flood alert is personalized for this registered user and a scroll bar is 1008 is shown because the message is longer than can be displayed within the area allocated for the text alert.

In the case of FIG. 10, the registered user previously provided alert parameters including that their height is 5 feet 6 inches. They have also registered the fact that they have a truck with raised suspension and large wheels and tires (i.e., a high clearance vehicle). As a result, the alert graphically displays two different evacuation routes, one for if this registered user must walk, and another if the user is with their high clearance vehicle (i.e., personalized based upon their pre-specified parameters).

Thus, by comparing FIGS. 8-10, it can be appreciated that, through use of embodiments of our invention, different people's abilities and situations can be accommodated. Moreover, a significant advantage arises because, in this case, evacuation can be smoother because vehicles and people can be segregated (as can different types of vehicles), thereby helping to alleviate bottlenecks caused by everyone following the same route or the chaos that can be caused by persons attempting certain routes only to find that their path is blocked or, because of their individual situation, they cannot proceed.

Still further, our system and methods allow for unseen significant hazards 814C within the flooded areas to be identified and avoided.

Finally, some further variants will be constructed such that historical information relating to, for example, the boundaries of the flood area of concern 160 will be retained, either in the non-volatile storage 112 of the UAS 102 or in the non-volatile storage 130 of the management operations subsystem 122 so that, in the future, it can be used to predict future issues or identify likely flood areas prior to an actual flood event. For example, if the historical information shows that, on multiple occasions, a particular part of a road washes away, when flooding occurs as a result of a storm that arrives from an atypical direction, creating a deep underwater hazard. That information could be used to predict that, if a new storm may arrive from that direction, the likelihood of a similar washout happening again is likely. In that way, mitigation efforts can be taken before the storm arrives or the likelihood of a similar washout can be presumed. Similarly, such historical information can be used to determine a particular flight path and measurement spacings, for example, because it is known from the historical data that certain flood covered areas rarely develop deep hazards, whereas other areas routinely develop deep hazards, but the locations of those hazards are not consistently in the exact same location(s). As a result, the UAV 104 flight path can be prioritized, and it can be directed, such that the UAV 104 flight path causes more passes to be taken in one area to allow for the taking of more "fine grained" readings (i.e., closer together) in the general areas where the deep hazards form, but the UAV 104 can fly a more dispersed flight path over areas where, although flooded, are unlikely to have any deep hazards. Alternatively, the historical data can be used to prioritized what parts of flood area of concern 160 are scanned for depth before others and how often, thereby allowing for more efficient coverage of a larger area.

Likewise, the historical information can be used such that the overall system (i.e., UAS 102 and management operations subsystem 122 "learn" certain information. For example, an area subject to unusual flooding near a coast, may have some areas where the correction factors for the depth readings may need to take into account that some of the flooding is due to mountain runoff, necessitating a different set of corrections for that part of the flood area of concern 160 whereas another part of the flood area of concern 160 may be made up entirely of sea water, rendering it subject to a different set of corrections. In such a case, the historical information can allow the corrections to be automatically switched based upon the GPS-determined location of the UAV 104 as it flies over the different parts of the flood area of concern 160.

Having described and illustrated the principles of this application by reference to one or more example embodiments, it should be apparent that the embodiment(s) may be modified in arrangement and detail without departing from the principles disclosed herein, including the different modifications, permutations and combinations of the variations described herein, and that, unless they are inherently and necessarily mutually exclusive, it is intended that the application be construed as including embodiments representing all possible permutations and combinations and/or modifications and that they are intended as disclosed variations insofar as they come within the spirit and scope of the subject matter disclosed.

What is claimed is:

1. A flood warning system comprising:
    at least one processor coupled to non-transient storage such that the at least one processor can cause information to be stored within the non-transient storage and retrieved from the nontransient storage, the non-transient storage having stored therein personal screening information associated with each of multiple registered personal mobile devices;
    a flood alarm system implemented in a cloud environment, that will, based upon GPS information received from an Unmanned Aerial Vehicle (UAV), communicatively determine whether any of the registered multiple personal mobile devices are within a specified range of a flood impacted area and, based upon ultrasound-derived flood depth information received from the UAV, determine if any specific ones of the multiple personal mobile devices are within the specified range of the flood impacted area, and will communicate flood-related data messages, screened based upon non-transiently stored personal screening information, retrieved from the non-transient storage and associated with each of the registered personal mobile devices, to the specific personal mobile devices, so as to cause only relevant personalized flood alerts to be displayed, using a processor of each of the specific personal mobile devices, on the specific personal mobile devices; and
    wherein the relevant personalized flood alerts comprise a heat map for at least a portion of the flood impacted area, the heat map indicating specific local depth hazards located under the flood waters within the portion, the heat map overlying on top of a street-level geographical map of the portion so that users of the specific personal mobile devices can maneuver through a part of the portion via directions specifying an appropriate path that is provided as part of the relevant personalized flood alerts and avoids specific relevant local depth hazards.

2. The flood warning system of claim 1 wherein the heat map indicates specific local depth hazards using shading.

3. The flood warning system of claim 2 wherein the heat map further comprises:
    a flood depth indicator key correlating the shading with specific ultrasound-derived flood depths.

4. The flood warning system of claim 1 further comprising:
    an interface, located on registered personal mobile devices, within which the relevant personalized flood alerts are displayed.

5. The flood warning system of claim 1 wherein the personal screening information comprises one or more of:
    height, age, mobility issues, ability to swim, or whether an adult user may be accompanied by a child.

6. The flood warning system of claim 1 wherein the personal screening information comprises one or more of:
    vehicle make, vehicle model, or existence of vehicle height modifications.

* * * * *